United States Patent
Sun et al.

(10) Patent No.: US 10,542,271 B2
(45) Date of Patent: Jan. 21, 2020

(54) METHOD AND APPARATUS FOR MAJOR COLOR INDEX MAP CODING

(71) Applicant: HFI Innovation Inc., Zhubei, Hsinchu County (TW)

(72) Inventors: Yu-Chen Sun, Keelung (TW); Tzu-Der Chuang, Zhubei (TW); Yi-Wen Chen, Taichung (TW); Yu-Wen Huang, Taipei (TW); Xianguo Zhang, Beijing (CN)

(73) Assignee: HFI Innovation Inc., Zhubei, Hsinchu County (TW)

( * ) Notice: Subject to any disclaimer, the term of this patent is extended or adjusted under 35 U.S.C. 154(b) by 51 days.

(21) Appl. No.: 15/107,915

(22) PCT Filed: Dec. 17, 2014

(86) PCT No.: PCT/CN2014/094036
§ 371 (c)(1),
(2) Date: Jun. 23, 2016

(87) PCT Pub. No.: WO2015/096647
PCT Pub. Date: Jul. 2, 2015

(65) Prior Publication Data
US 2016/0323594 A1  Nov. 3, 2016

Related U.S. Application Data

(60) Provisional application No. 62/002,221, filed on May 23, 2014, provisional application No. 61/952,917, (Continued)

(30) Foreign Application Priority Data

Dec. 27, 2013  (WO) ................ PCT/CN2013/090761

(51) Int. Cl.
*H04N 19/176*  (2014.01)
*H04N 19/186*  (2014.01)
(Continued)

(52) U.S. Cl.
CPC ......... *H04N 19/463* (2014.11); *H04N 19/129* (2014.11); *H04N 19/176* (2014.11); *H04N 19/593* (2014.11); *H04N 19/88* (2014.11)

(58) Field of Classification Search
CPC .... H04N 19/463; H04N 19/88; H04N 19/157; H04N 19/176; H04N 19/593; H04N 19/129; H04N 19/91
(Continued)

(56) References Cited

U.S. PATENT DOCUMENTS 7,343,037 B1  3/2008  Kadatch
9,654,806 B2  5/2017  Zou et al.
(Continued)

FOREIGN PATENT DOCUMENTS

CN  101068352 A  11/2007
CN  101217668 A  7/2008
(Continued)

OTHER PUBLICATIONS

Joshi, R., et al.; "RCE2: Summary report on HEVC Range Extensions Core Experiment 2 (RCE2) on Prediction and Coding Techniques for Transform-Skip and Transform-Bypass Blocks;" Joint Collaborative Team on Video Coding (JCT-VC) of ITU-T SG 16 WP 3 and ISO/IEC JTC 1/SC 29/WG 11; Jul.-Aug. 2013; pp. 1-12.
(Continued)

*Primary Examiner* — Susan E. Hodges
(74) *Attorney, Agent, or Firm* — Oblon, McClelland, Maier & Neustadt, L.L.P.

(57) ABSTRACT

A method and apparatus for palette coding of a block of video data using multiple color index scanning orders involve: receiving input data associated with a current block; determining whether transposing a color index map for palette coding is selected; responsive to selecting transposing the color index map, encoding or decoding color indices of the current block according to a transposed palette or a transposed triplet palette; and responsive to not selecting transposing the color index map, encoding or decoding the color indices of the current block according to an original palette or an original triplet palette.

5 Claims, 6 Drawing Sheets

Related U.S. Application Data filed on Mar. 14, 2014, provisional application No. 61/922,131, filed on Dec. 31, 2013, provisional application No. 61/921,156, filed on Dec. 27, 2013.

(51) Int. Cl.
  *H04N 19/593* (2014.01)
  *H04N 19/105* (2014.01)
  *H04N 19/70* (2014.01)
  *H04N 19/463* (2014.01)
  *H04N 19/129* (2014.01)
  *H04N 19/88* (2014.01)

(58) Field of Classification Search
  USPC ......................................................... 375/240
  See application file for complete search history.

(56) References Cited

U.S. PATENT DOCUMENTS

| | | | |
|---|---|---|---|
| 9,749,628 | B2 | 8/2017 | Chuang et al. |
| 2008/0170612 | A1* | 7/2008 | Zhou ................... G06T 3/60 375/240.03 |
| 2009/0010533 | A1 | 1/2009 | Hung |
| 2009/0074307 | A1 | 3/2009 | Lu et al. |
| 2009/0110305 | A1* | 4/2009 | Fenney ................ G06T 9/005 382/232 |
| 2009/0147855 | A1 | 6/2009 | Song et al. |
| 2011/0135000 | A1 | 6/2011 | Alshina et al. |
| 2013/0003837 | A1 | 1/2013 | Yu et al. |
| 2013/0170546 | A1 | 7/2013 | Kim et al. |
| 2013/0251046 | A1 | 9/2013 | Matsunobu et al. |
| 2013/0272401 | A1 | 10/2013 | Seregin et al. |
| 2014/0003531 | A1 | 1/2014 | Coban et al. |
| 2014/0086333 | A1 | 3/2014 | Wang |
| 2014/0105002 | A1 | 4/2014 | Pan |
| 2014/0241630 | A1 | 8/2014 | MacInnis et al. |
| 2014/0301475 | A1 | 10/2014 | Guo et al. |
| 2015/0016501 | A1* | 1/2015 | Guo ..................... G06T 9/00 375/240.02 |
| 2015/0146976 | A1 | 5/2015 | Ma et al. |

FOREIGN PATENT DOCUMENTS

| | | |
|---|---|---|
| CN | 101340587 | 1/2009 |
| CN | 101365136 A | 2/2009 |
| CN | 101816177 A | 8/2010 |
| CN | 102800365 A | 11/2012 |
| CN | 103248893 A | 8/2013 |
| EP | 2 645 719 A2 | 10/2013 |
| WO | 2009/036255 A2 | 3/2009 |
| WO | 2012/147622 A1 | 11/2012 |
| WO | 2012/160890 A1 | 11/2012 |
| WO | 2012/171463 A1 | 12/2012 |
| WO | 2013/046095 A1 | 4/2013 |
| WO | 2013/069216 A1 | 5/2013 |
| WO | 2015/179814 A1 | 11/2015 |

OTHER PUBLICATIONS

Yu, Y., et al.; "Adaptive Scan for Large Blocks for HEVC;" Joint Collaborative Team on Video Coding (JCT-VC) of ITU-T SG 16 WP 3 and ISO/IEC JTC 1/SC 29/WG 11; Jul. 2011; pp. 1-6.

International Search Report dated Mar. 23, 2015, issued in application No. PCT/CN2014/094036.

Guo, L. et al; "Palette Mode for Screen Content Coding;Joint Collaborative Team on Video Coding;" (JCT-VC) of ITU-T SG 16 WP 3 and ISO/IEC JTC 1/SC 29/WG 11; Apr. 2013; pp. 1-11.

Guo, L. et al; "Palette Mode for Screen Content Coding;" Joint Collaborative Team on Video Coding (JCT-VC) of ITU-T SG 16 WP 3 and ISO/IEC JTC 1/SC 29/WG 11; Apr. 2013; pp. 1-5.

Guo, L. et al; "Palette Mode for Screen Content Coding;" Joint Collaborative Team on Video Coding (JCT-VC) of ITU-T SG 16 WP 3 and ISO/IEC JTC 1/SC 29/WG 11; Apr. 2013; pp. 1-6.

Guo, L., et al, "Non-RCE3: Modified Palette Mode for Screen content Coding;" Joint Collaborative Team on Video Coding (JCT-VC) of ITU-T SG 16 WP 3 and ISO/IEC JTC 1/SC 29/WG 11; Aug. 2013; pp. 1-6.

Guo, X., et al; "AHG8: Major-color-based screen content coding;" Joint Collaborative Team on Video Coding (JCT-VC) of ITU-T SG 16 WP 3 and ISO/IEC JTC 1/SC 29/WG 11; Nov. 2013; pp. 1-7.

Guo, X., et al; "AHG8: Major-color-based screen content coding;" Joint Collaborative Team on Video Coding (JCT-VC) of ITU-TSG 16 WP 3 and ISO/IEC JTC 1/SC 29/WG 11; Nov. 2013; pp. 1-10.

Sun, Y.C., et al; "SCCE3 Test B.4: Adaptive color index map scan;" Joint Collaborative Team on Video Coding (JCT-VC) of ITU-T SG 16 WP 3 and ISO/IEC JTC 1/SC 29/WG 11; Jul. 2014; pp. 1-8.

Zhu, J., et al, "AHG10: Adaptive Scan Oder on Palette Based Coding;" Joint Collaborative Team on Video Coding (JCT-VC) of ITU-T SG 16 WP 3 and ISO/IEC JTC 1/SC 29/WG 11; Apr. 2014.

Sun, Y.C., et al.; "AHG10: A triplet palette mode combining JCTVC-P0108 and JCTVC-P0198;" Joint Collaborative Team on Video Coding (JCT-VC) of ITU-T SG 16 WP 3 and ISO/IEC JTC 1/SC 29/WG 11; Mar.-Apr. 2014; pp. 1-9.

Esenlik, S., et al.; "AHG4: Dependent slices restriction;" Joint Collaborative Team on Video Coding (JCT-VC) of ITU-T SG 16 WP 3 and ISO/IEC JTC 1/SC 29/WG 11; Oct. 2012; pp. 1-6.

Chen, J., et al.; "Description of screen content coding technology proposal by Qualcomm;" Joint Collaborative Team on Video Coding (JCT-VC) of ITU-T SG 16 WP 3 and ISO/IEC JTC 1/SC 29/WG 11; Mar.-Apr. 2014; pp. 1-19.

Misra, K., et al.; "Modifications to palette coding for tiles/slices/dependent slices/wavefronts;" Joint Collaborative Team on Video Coding (JCT-VC) of ITU-T SG 16 WP 3 and ISO/IEC JTC 1/SC 29/WG 11; Jun.-Jul. 2014; pp. 1-4.

Zhu, W., et al.; "Non-RCE3 Template-based palette prediction;" Joint Collaborative Team on Video Coding (JCT-VC) of ITU-TSG 16 WP 3 and ISO/IEC JTC 1/SC 29/WG 11; Apr. 2013; pp. 1-8.

Sun, Y.C., et al.; "Non-RCE4 Cross-Cu major color index prediction;" Joint Collaborative Team on Video Coding (JCT-VC) of ITU-T SG 16 WP 3 and ISO/IEC JTC 1/SC 29/WG 11; Jan. 2014; pp. 1-5.

Chuang, T.D., et al.; "Non-RCE4: Four-neighbor major color index prediction;" Joint Collaborative Team on Video Coding (JCT-VC) of ITU-T SG 16 WP 3 and ISO/IEC JTC 1/SC 29/WG 11; Jan. 2014; pp. 1-5.

Laroche, G., et al.; "Non-RCE4: Palette Prediction for Palette mode;" Joint Collaborative Team on Video Coding (JCT-VC) of ITU-T SG 16 WP 3 and ISO/IEC JTC 1/SC 29/WG 11; Jan. 2014; pp. 1-6.

Sun, Y.C., et al.; "Non-RCE4: Removal of syntax redundancy in RCE4 Test2;" Joint Collaborative Team on Video Coding (JCT-VC) of ITU-T SG 16 WP 3 and ISO/IEC JTC 1/SC 29/WG 11; Jan. 2014; pp. 1-5.

Seregin, V., et al.; "Non-SCCE3: Palette predictor resetting;" Joint Collaborative Team on Video Coding (JCT-VC) of ITU-T SG 16 WP 3 and ISO/IEC JTC 1/SC 29/WG 11; Jun.-Jul. 2014; pp. 1-4.

Guo, L., et al.; "RCE3: Results of Test 3.1 on Palette Mode for Screen Content Coding;" Joint Collaborative Team on Video Coding (JCT-VC) of ITU-T SG 16 WP 3 and ISO/IEC JTC 1/SC 29/WG 11; Jul.-Aug. 2013; pp. 1-7.

Guo, X., et al.; "RCE4 Test 1. Major-color-based screen content coding;" Joint Collaborative Team on Video Coding (JCT-VC) of ITU-T SG 16 WP 3 and ISO/IEC JTC 1/SC 29/WG 11; Jan. 1-12.

Office Action dated Jul. 4, 2018, in Chinese Patent Application No. 201480070568.9.

Weerakkody et al., "Mirroring of Coefficients for Transform Skipping in Video Coding," MMSP '13, Sep. 30-Oct. 2, 2013.

Summons to attend oral proceedings dated May 31, 2019, in corresponding European Patent Application No. 14874725.6.

Pu et al., "Non-CE6: Syntax Redundancy Fixes for Palette Mode," Joint Collaborative Team on Video Coding (JCT-VC) of ITU-T SG 16 WP 3 and ISO/IEC JTC 1/SC 29/WG 11, 19th Meeting: Strasbourg, France, Oct. 2014.

* cited by examiner

METHOD AND APPARATUS FOR MAJOR COLOR INDEX MAP CODING

CROSS REFERENCE TO RELATED APPLICATIONS

The present invention a national stage of PCT/CN2014/094036, filed Dec. 12, 2017, which claims priority to PCT Patent Application, Serial No. PCT/CN2013/090761, filed on Dec. 27, 2013. The present invention also claims priority to U.S. Provisional Patent Application, Ser. No. 61/921,156, filed on Dec. 27, 2013, U.S. Provisional Patent Application, Ser. No. 61/922,131, filed on Dec. 31, 2013, U.S. Provisional Patent Application, Ser. No. 61/952,917, filed on Mar. 14, 2014 and U.S. Provisional Patent Application, Ser. No. 62/002,221, filed on May 23, 2014. The U.S. Provisional Patent Applications and PCT Patent Application are hereby incorporated by reference in their entireties.

FIELD OF INVENTION

The present invention relates to palette coding for video data. In particular, the present invention relates to techniques to improve the performance of palette prediction using multiple palette index scanning orders and color index map rotation.

BACKGROUND OF THE INVENTION

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the palette coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the palette coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247). In JCTVC-N0247, the palette of each color component is constructed and transmitted. The palette can be predicted (or shared) from its left neighboring CU to reduce the bitrate. All pixels within the given block are then coded using their palette indices.

A second version of their palette coding technique has also been disclosed by Guo et al., in JCTVC-N0249 (Guo et al., "*Non-RCE3: Modified Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0249), where each element in the palette is a triplet representing a specific combination of the three color components. The palette index is shared by all color components to reduce overhead.

The palette coding procedure disclosed in JCTVC-N0249 is described as follows.

Scan the CU in horizontal scan order (or so called raster scan order). The scan runs in the horizontal direction for each line from top line to bottom line, as shown in FIG. 1.

Signal palette index using one of the following 2 modes:
  Run mode: signal "palette_index" followed by "run"
    In "run mode", a palette index is first signaled followed by "palette_run" (e.g., M). No further information needs to be transmitted for the current position and the following M positions as they have the same palette index as signaled.
  Copy top mode: Signal a "copy run"
    In "copy above mode", a value "copy_run" (e.g., N) is transmitted to indicate that for the following N positions (including the current one), the palette index is equal to the palette index of the one that is at the same location in the row above.

Another major color-base coding (palette coding) method is disclosed by Guo et al. in JCTVC-O0182 (Guo et al., "*AHG8: Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). According to JCTVC-O0182, the palette of each component are constructed and transmitted. However, the coding of the palette index is different from that in JCTVC-N0247. The following describes the procedure to code the palette indices according to JCTVC-O0182.

Scan the CU in horizontal scan order (or so called raster scan order). The scan runs in the horizontal direction for each line from top line to bottom line, as shown in FIG. 1.

Signal one line of palette index using one of the following 3 modes:
  horizontal mode
    In horizontal mode, all the pixels in the same line have the same value. If the value is the same as the first pixel of the above pixel line, only line mode signalling bits are transmitted. Otherwise, the index value is also transmitted.
  vertical mode
    In vertical mode, the current pixel line is the same as the above pixel line. Therefore, only line mode signaling bits are transmitted.
  normal mode
    In normal mode, pixels in a line are predicted individually. For each pixel, the left or above neighbors is used as predictor, and the prediction symbol is transmitted to the decoder.

It is desirable to develop methods for further improving the coding efficiency and/or reducing the complexity associated with the palette coding.

SUMMARY OF THE INVENTION

A method and apparatus for palette coding of a block of video data using multiple color index scanning orders or transpose of color index map are disclosed. In one embodiment, a scanning direction is determined for the current block, where the scanning direction is selected from a scan group consisting of at least one non-horizontal scan. If the non-horizontal scan is used, the color indices of the current block are encoded or decoded according to the non-horizontal scan using a palette or a triplet palette. In one example, said at least one non-horizontal scan corresponds to a vertical scan. In another example, said at least one non-horizontal scan corresponds to a vertical scan, zig-zag scan, Hilbert scan, diagonal scan, inverse diagonal scan, or any combination thereof.

The scanning direction for the current block can be signaled using an adaptive scan flag and an encoder side and parsing the adaptive scan flag to determine the scanning direction, wherein the current block corresponds to a CU (coding unit). Furthermore, the adaptive scan flag can be coded using context adaptive coding. The context adaptive coding may depend on the coding information of a palette-coded neighboring block on a left side or an upper side of the current block. The context adaptive coding may also depend on the depth of the current block. The context adaptive coding may use a first context if the depth of the current block is larger than a threshold and the context adaptive coding may use a second context if the depth of the current block is not larger than the threshold. The adaptive scan flag can be incorporated in a TU (transform unit) level, PU (prediction unit) level, CU (coding unit) level, LCU (largest CU) level, slice level, picture level, PPS (picture parameter set), SPS (sequence parameter set) or VPS (video parameter set).

The scanning direction can also be determined implicitly by using a same derivation process for the scanning direction at an encoder side and a decoder side. The encoding or decoding color indices of the current block according to the horizontal scan or then on-horizontal scan may include using a color index prediction mode selected from a mode group consisting of "copy left", "copy left column", "column filling", "copy irregular shape", "fill irregular shape", "fill L shape" and "fill L shape".

In another embodiment, the palette coding determines whether to transpose color index map. If transpose of the color index map is selected, the color indices of the current block are encoded or decoded according to a transposed palette or a transposed triplet palette. If transpose of the color index map is not selected, the color indices of the current block are encoded or decoded according to an original palette or an original triplet palette. The palette or triplet palette transpose can be implemented by swapping the x-index with y-index of the color indices of the current block and using the original palette or triplet palette. Whether to use color index map rotation can be indicated at an encoder side by signaling a rotation flag or derived at a decoder side by parsing the rotation flag from a bitstream. The rotation flag can be incorporated in a TU (transform unit) level, PU (prediction unit) level, CU (coding unit) level, LCU (largest CU) level, slice level, picture level, PPS (picture parameter set), SPS (sequence parameter set) or VPS (video parameter set).

BRIEF DESCRIPTION OF THE DRAWINGS

FIG. 6A and FIG. 6B illustrate an example of transpose of color index map, where the color index map in FIG. 6B corresponds to a transposed color index map in FIG. 6A.

FIG. 8 illustrates an example of a pixel signaled as a weighted color (WC) pixel.

FIG. 9A illustrates an example of deriving the color for a weighted color (WC) pixel based on two neighboring pixels on the left and right of the WC pixel.

FIG. 9B illustrates an example of deriving the color for a weighted color (WC) pixel based on two neighboring pixels on the top and bottom of the WC pixel.

FIG. 9C illustrates an example of deriving the color for a weighted color (WC) pixel based on four neighboring pixels of the WC pixel.

FIG. 10A illustrates an example of two pixels signaled as weighted color (WC) pixels.

FIG. 10B illustrates an example of deriving the colors for weighted color (WC) pixels based on two neighboring pixels on the left and right of the WC pixels.

DETAILED DESCRIPTION

Figure 1:
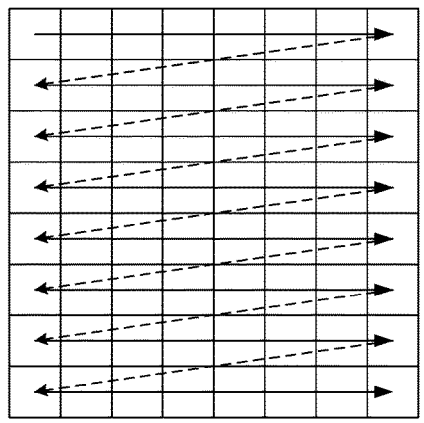
FIG. 1 illustrates an example of horizontal scanning order for color index map coding.

In the present invention, various techniques to improve the performance of palette coding are disclosed. In particular, efficient palette coding techniques regarding prediction direction of palette index map coding, transposed color index map and layered palette/triplet palette coding are disclosed.

As mentioned before, the palette coding as disclosed in JCTVC-N0247, JCTVC-O0182 and JCTVC-B0249 support "run" mode, "copy top" mode, "horizontal" mode and "vertical" mode. In order to improve the performance, additional palette index coding modes (i.e., prediction modes) are disclosed according to the present invention.

Furthermore, when the neighboring palette index value used to predict current palette index is not available, a default value (e.g. zero) or a derived value based on the pixel value of the neighboring reconstructed pixels are used according to the present invention.

In one embodiment, the additional palette index coding modes include:

"copy top-left" mode. In "copy top-left" mode, a value "copy_run" (e.g., N) is transmitted or derived to indicate that the palette index (also called color index in this disclosure) is equal to the palette index of the top-left location for the following N positions (including the current one).

"copy top-right" mode. In "copy top-right" mode, a value "copy_run" (e.g., N) is transmitted or derived to indicate that the palette index is equal to the palette index of the top-right location for the following N positions (including the current one).

"copy temporal" mode. In "copy temporal" mode, a value "copy_run" (e.g., N) is transmitted or derived to indicate that the palette index is equal to the palette index of the collocated location in the temporal reference picture for the following N positions (including the current one).

"copy prediction" mode. In "copy prediction" mode, a value "copy_prediction" (e.g., N) is transmitted or derived to indicate that for the following N positions (including the current one), the palette index is equal to the palette index of the palette predictor. The palette predictor can be derived from the coded palette index, which can include the multiple coded rows/columns. For example, the palette predictor may be derived from above two rows and the gradient (e.g., edge or structure) of the ltiple coded rows/columns may propagate to the current row.

In another embodiment, the additional palette index coding modes may include the above additional modes and the following additional modes:

"copy left-down" mode. In "copy left-down" mode, a value "copy_run" (e.g., N) is transmitted or derived to indicate that for the following N positions (including the current one), the palette index is equal to the palette index of the left-down location.

In yet another embodiment, the additional palette index coding modes include:

"copy left" mode. In "copy left" mode, a value "copy_run" (e.g., N) is transmitted or derived to indicate that the palette index is the same as that at the same location in the left column for the following N positions (including the current one). In one example, N is 1. In another example, the N can be the number of the remaining palette indices that are not coded yet within the same line.

"copy left column" mode. In "copy column left" mode, all the pixels in the same column have the same value. If the value is the same as the first pixel of the left pixel column, only line mode signaling bits are transmitted. Otherwise, the index value is also transmitted.

"column filling" mode. In "column filling" mode, all the pixels in the same column (vertical line) have the same value. If the value is the same as the first pixel of the left pixel column, the first pixel of the above pixel row, or any other derived location, then only line mode signaling bits are transmitted. Otherwise, the index value is also transmitted.

"copy irregular shape" mode. In "copy irregular shape" mode, a shape description is transmitted or derived to indicate that following N positions (including the current one) in the shape use the palette index at a transmitted or derived location.

"fill irregular shape" mode. In "fill irregular shape" mode, a shape description is transmitted or derived to indicate following N positions (including the current one) in the shape use the same value. If the value is the same as the first pixel of the left pixel column, the first pixel of the above pixel row, or any other derived location, then only prediction shape description bits (and prediction description bits) are transmitted. Otherwise, the index value is also transmitted.

Figure 2:
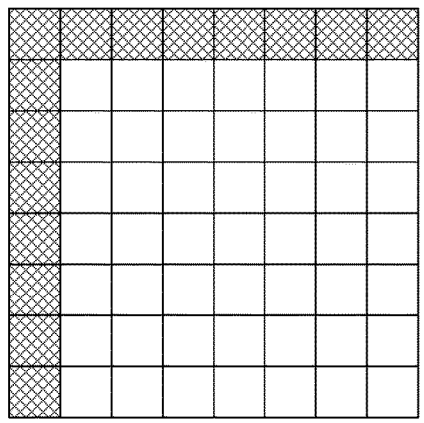
FIG. 2 illustrates an example of L shape for "copy L shape" and "fill L shape" mode for color index map coding.

"copy L shape" mode. In "copy L shape" mode, following N positions (including the current one) in the L shape use the palette index at a transmitted or derived location. An example of L shape is illustrated in FIG. 2.

"fill L shape" mode. In "fill L shape" mode, following N positions (including the current one) in the L shape have the same value. If the value is the same as the first pixel of the left pixel column, the first pixel of the above pixel row, or any other derived location, then only prediction shape description bits (and prediction description bits) are transmitted. Otherwise, the index value is also transmitted.

In order to operate a decoder properly, information related to the selected prediction mode at the encoder side has to be conveyed to the decoder side. The encoder may signal the prediction mode. The prediction mode may be determined adaptively. The encoder may use adaptive signaling method to select different VLC code to signal the mode according to the position of the current pixel. Another adaptive signaling method may turn off some modes according to the position of the current pixel.

Different Scanning Orders for Coding Palette Index

In JCTVC-N0247, only horizontal scanning order is used for coding the palette index. The color indices in a block are processed according to the horizontal scanning order. The color indices in the horizontal scanning order are then coded using various prediction modes, such as the "run" mode, "copy top" mode, "horizontal" mode and "vertical" mode. Additional scanning orders have also been disclosed according to the present invention.

Vertical Scanning Order.

Figure 3:
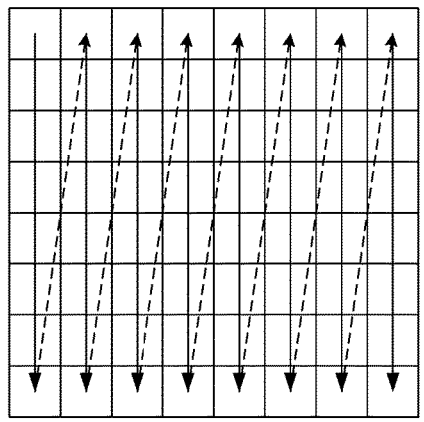
FIG. 3 illustrates an example of vertical scanning order for color index map coding according to an embodiment of the present invention.

An example of vertical scanning order is illustrated in FIG. 3, where the palette index of each pixel is scanned column by column vertically from top pixel to bottom pixel within each column. Furthermore, the scanning starts from left to right.

The palette coding using vertical scanning order can be combined with other palette coding methods. For example, the vertical scanning can be used with the "run" mode disclosed in JCTVC0N0247. It may also be combined with the "copy top" mode. However, "the copy top" mode is modified to "copy left" mode in this CASE. The "normal" mode disclosed in JCTVC-O0182 can still be the same and the "horizontal" and "vertical" modes are modified as "copy left column" and "column filling" modes respectively.

Other Scanning Orders.

Figure 4:
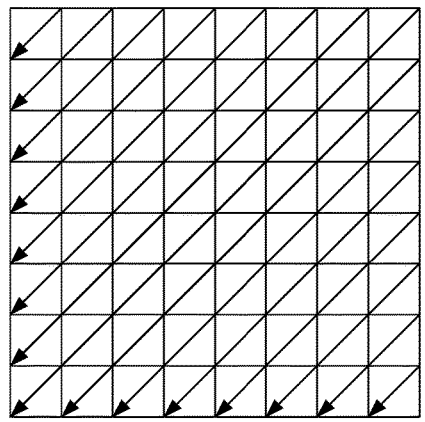
FIG. 4 illustrates an example of diagonal scanning order for color index map coding according to an embodiment of the present invention.
Figure 5:
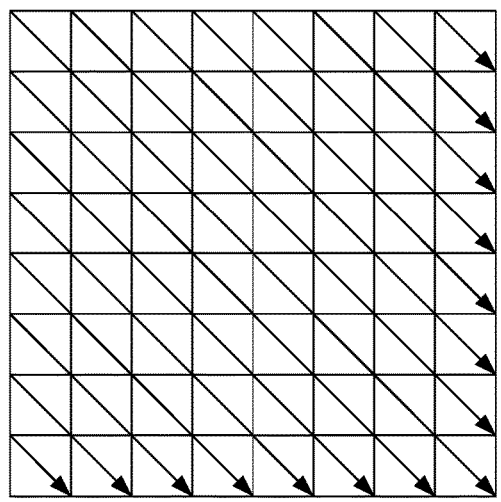
FIG. 5 illustrates an example of inverse diagonal scanning order for color index map coding according to an embodiment of the present invention.

Other scanning patterns such as zig-zag, Hilbert scanning, diagonal scanning and inverse diagonal scanning can also be used. FIG. 4 illustrates an example of diagonal scanning and FIG. 5 illustrates an example of inverse diagonal scanning.

Signaling of Scanning Order.

When different scanning patterns (also called scanning orders in this disclosure) are used, the scanning pattern used for a block (e.g., CU) may need to be signaled so that a decoder can use the same scanning patterns as the encoder. In this case, an additional syntax can be signaled to indicate which one among the different scanning orders (e.g., horizontal scanning, vertical scanning, zig-zag scanning, Hilbert scanning, etc.) is used for coding the palette index. In addition, the associated coding method needs to be signaled. The selection of scanning order and the associated coding methods can also be implicitly derived at the encoder and decoder sides through an identical derivation process without explicitly signaling any additional syntax. The scanning order coding, either by explicit signaling or implicit derivation based on previously used scanning order, can be done in the PU level, CU level, slice level, picture level or sequence level.

The concept of color index map transpose can be applied to palette index or triplet palette index. For a palette coded CU, a palette/triplet palette index rotation flag can be signaled. If the flag equal to one, the sample position axes will be switched. In other words, color_index[x0][y0] originally indicates the x position as x0 and the y position as y0. If the flag equal to one, it indicates the y position as x0 and the x position as y0. The color indexes are equivalently transposed.

Context Formation for Palette Mode Flag.

In palette mode coding, several flags have been used. For example, palette_mode_flag indicates whether the CU uses the palette mode, palette_scan_flag indicates whether the index scan uses the vertical scan or horizontal scan, and palette_share_flag indicates whether the last coded palettes are reused for the current CU. The context formation for these flags may use only one context without any neighboring information or use multiple contexts with neighboring information. For example, palette_mode_flag may use two contexts and the context index depends on whether the left CU or above CU is coded in palette mode. The context formation of these flags may also depend on the current CU information such as the CU depth. In another example, the context index can be max(2, CU_depth) or max(2, max_CU_depth-CU_depth).

The encoder can signal one flag to indicate if the tool is enabled. The flag can be context coded. The context model can be based on the CU, PU or TU size. For example, different CU, PU, or TU sizes can use different context models. In another example, a threshold Ts can be set and if the size is larger than Ts, one context model is used. On the other hand, if the size is smaller than Ts, another model is used.

The context model can be derived from a flag associated with the left or the above CU. If the flag is ON, one context model is used. If the flag is OFF, another context model is used. The context model may also be derived from the flag of a last palette coded CU. If the flag is ON, one context model is used. If the flag is OFF, another context model is used.

Color Index Map Transpose.

An embodiment of the present invention provides flexibility to the color table index map by allowing the index map to flip or rotate. For example, FIG. 6A illustrates an example of an original index map. The index map may be flipped from the lower left corner to the upper right corner (i.e., row-column flip). The flipped index map is shown in FIG. 6B. After flip, the first row in FIG. 6A becomes the first column in FIG. 6B. Similarly, the second row in FIG. 6A becomes the second column in FIG. 6B, and so on. The column-row flip corresponds to a matrix transpose operation. The index map can be flipped firstly and then encoded.

The color index map transpose disclosed above can be enabled or disabled at different coding levels to provide different levels of flexibility, where the different levels include TU (transform unit), PU (prediction unit), CU (coding unit), CTB (coding tree block), slice, picture and sequences levels. For example, if one CU is major color (i.e., palette) coded, one flag can be signaled for a major color coded CU to indicate if the color index map transpose is enabled or not.

Layer Color Representation

In the palette coding mode, pixels in each CU are classified into major colors and escape pixels. Major colors are the most representative pixel values in a CU, which cover the majority pixels of the CU. On the other hand, escape pixels are the pixels that do not belong to the major colors.

An embodiment of the present invention discloses a layered color (LC) representation to describe major colors. Based on the LC representation, each pixel is represented by a triplet color index. And the triplet color index is predictive coded and transmitted to indicate whether the pixel is a major-color pixel or not. If it is a major-color pixel, it further indicates the major color it belongs to.

To describe major colors in a CU, a two layers description is disclosure in this invention. The first layer describes the most representative color values in each component, called major colors. Based on major colors, the second layer describes the most representative combination, called major (color) combination.

Layered Color Representation

For each CU, an encoder first calculates the histogram of color values for each color component and chooses a set of representative major color values. These major colors are stored as palettes for each color component. Then, based on the set of major color values for each color component, an encoder further chooses a set of representative color combinations. The combinations are recorded as a triplet palette.

The present invention can be applied to any color format such as YUV444, YUV420, YUV422, YUV400 or RGB. The combination of second layer can be applied to all components or a subset of components. For example, for YUV444 and RGB, the combinations of the second layer can be applied on all components as shown in Tables 1(a)-1(d). Tables 1(a)-1(c) correspond to the first layer color table representation, i.e., three individual color tables for respective color components. Table 1(d) is an example of the second layer color representation corresponding to triple index.

TABLE 1(a)

| $1^{st}$ component's major color index | $1^{st}$ component's major color value |
|---|---|
| 0 | value [0][$1^{st}$ color] |
| ... | |
| $N_1$ | value [$N_1$][$1^{st}$ color] |

TABLE 1(b)

| $2^{nd}$ component's major color index | $2^{nd}$ component's major color value |
|---|---|
| 0 | value [0][$2^{nd}$ color] |
| ... | |
| $N_2$ | value [$N_2$][$2^{nd}$ color] |

TABLE 1(c)

| $3^{rd}$ component's major color index | $3^{rd}$ component's major color value |
|---|---|
| 0 | value [0][$3^{rd}$ color] |
| ... | |
| $N_3$ | value [$N_3$][$3^{rd}$ color] |

TABLE 1(d)

| 1st component's major color index | 1st component's major color value | 2nd component's major color value | 3rd component's major color value |
|---|---|---|---|
| 0 | value [0][1st color] | value [0][2nd color] | value [0][3rd color] |
| ... | | | |
| $N_4$ | value [$N_4$][1st color] | value [$N_4$][2nd color] | value [$N_4$][3rd color] |

Color Derivation for Palette/Triplet Palette from Neighboring Pixels

Colors in a palette and triplet palette can be derived or predicted from neighboring pixels. The list of these colors is called color candidate list. The size of the color candidate list can be fixed or adaptive. The size of the color candidate list can be transmitted or derived.

The palette can use Q colors in the color candidate list, where Q can be fixed or adaptively determined. Q could be transmitted or derived. The palette can use colors in the color candidate list as the major colors or use the color candidate list as the predictors for predicting the major colors in the palette.

The color candidate list can be constructed by inserting the color candidates in a predefined order into the color candidate list. The color candidates can be selected from the neighboring pixels of current coding block. According to the picture type associated with the neighboring pixels, a corresponding set of color candidates can be used as shown in FIG. 7A-FIG. 7C.

Spatial Color Candidates.

Figure 7A:
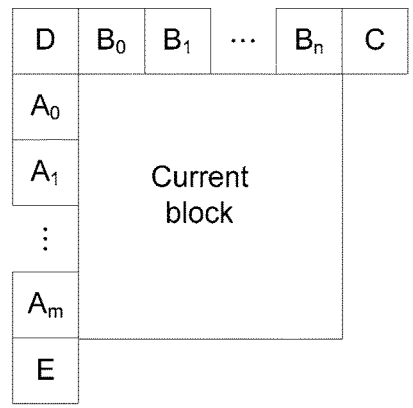
FIG. 7A illustrates an example of spatial neighboring pixels used for deriving colors in a palette and triplet palette.
Figure 7B:
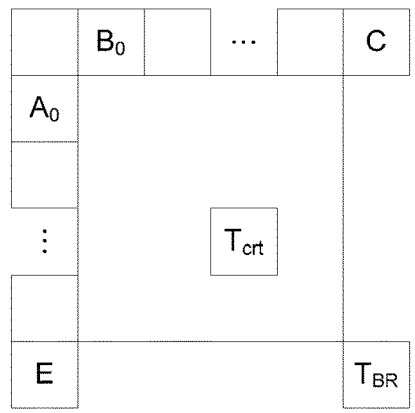
FIG. 7B illustrates an example of temporal neighboring pixels used for deriving colors in a palette and triplet palette.
Figure 7C:
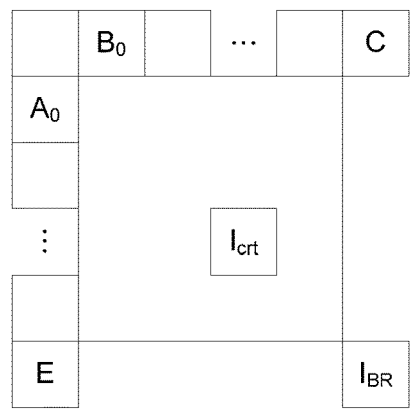
FIG. 7C illustrates an example of inter-view neighboring pixels used for deriving colors in a palette and triplet palette.

FIG. 7A illustrates an example of spatial neighboring pixels used to derive colors for the current palette. The spatial neighboring pixels (labelled as $A_0$-$A_m$, $B_0$-$B_m$, D, C and E) correspond to those reconstructed pixels around the current block in current picture. Reconstructed pixels can be reconstructed pixels before or after in-loop filtering, such as Sample Adaptive Offset (SAO) and deblocking filter. While the particular set of spatial neighboring pixels is used to derive colors for the current palette, other spatial neighboring pixels may also be used to practice the present invention. Furthermore, spatial color candidates may also include multiple rows and columns around the current coding unit.

Temporal Color Candidates.

The temporal neighboring pixels are those pixels co-located in the temporal reference picture of the current block. For example, FIG. 7B illustrates an example of the center location (i.e., $T_{ctr}$) of the co-located temporal block and a bottom-right location (i.e., $T_{BR}$) of the co-located temporal block. Temporal color candidates can be multiple pixels in temporal reference picture of the current block.

Inter-View Color Candidates.

Similarly, inter-view neighboring pixels may also be used as candidates to derive colors for the current palette. FIG. 7C illustrates an example of inter-view neighboring pixels $I_{ctr}$ and $I_{BR}$ in a reference view, where $I_{ctr}$ corresponds to the center location of the co-located inter-view block and $T_{BR}$ corresponds to the bottom-right location of the co-located inter-view block.

Additional Color Candidates.

Additional color candidates may also be inserted into the color candidate list. The additional color candidates can be a color with default value(s) such as zero, the middle value of the maximum allowed value, the maximum allowed value, the maximum of the neighboring pixels, the majority of the neighboring pixel, or the median of the neighboring pixels. Besides, the additional color candidates can be a modified pixel value based on the value derived from the neighboring pixels. For example, the additional color candidate can be derived by adding a constant value to one of the neighboring color candidates. To extend the spirit of deriving the additional color candidates from the neighboring reconstructed pixels, the additional candidates can also be derived from a look-up table which stores the top N majority pixel values. The look-up table can be designed based on the statistics of different levels such as the sequence level, picture level, slice level, coding block level (e.g. coding unit in HEVC) or prediction block level (e.g. prediction unit in HEVC).

Weighted Color (WC)

A new color type, called weighted color is disclosed in this invention. If a pixel is represented by a weighted color, it is constructed based on neighboring pixels. A weighted color can be treated as a major color and signaled using the same signaling method, i.e. by a color index or triplet index.

Figures 8, 9A, 10A:
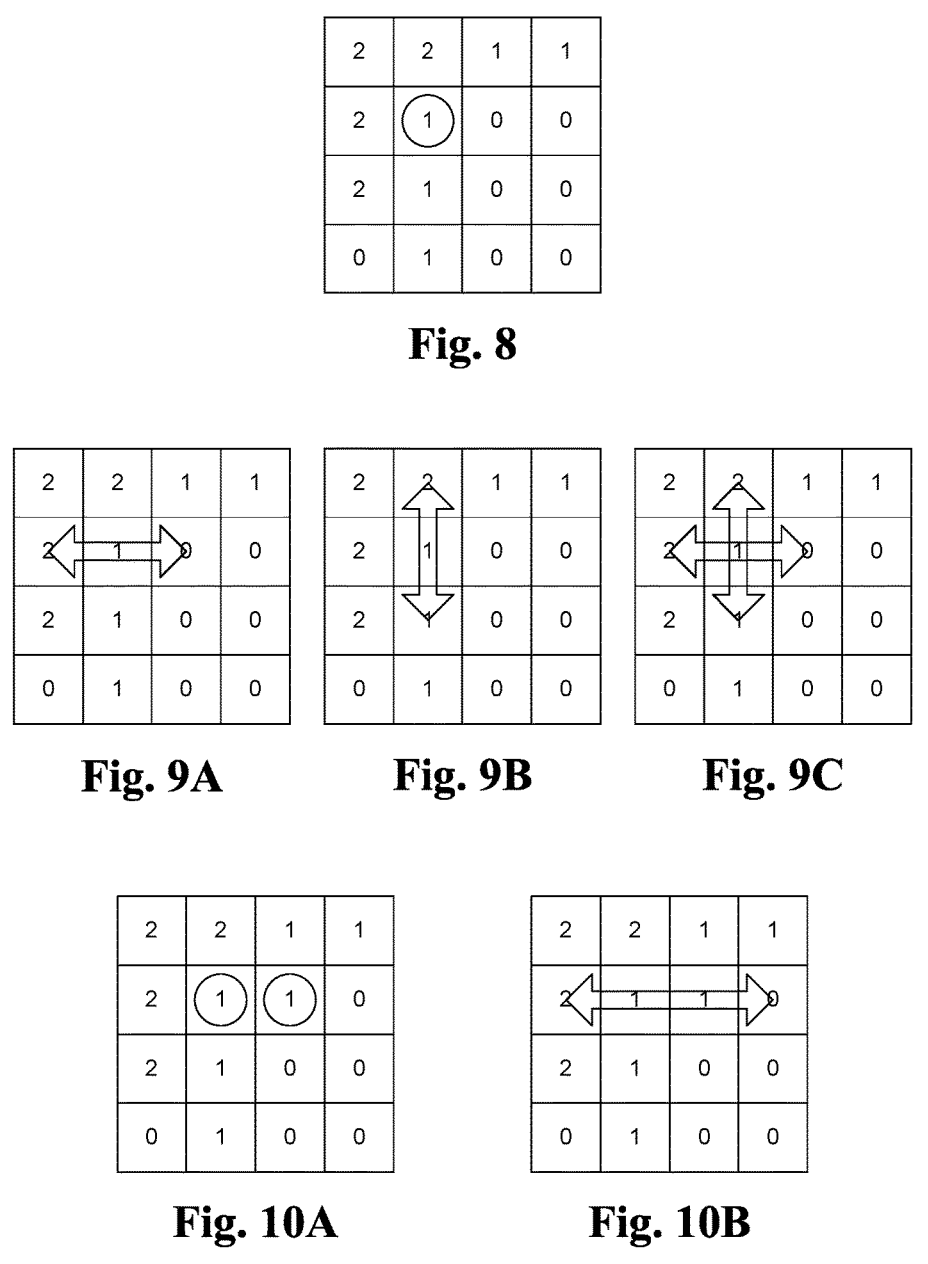

FIG. 8 illustrates an example of a weighted color as indicated by a circle. The pixel is signaled as a WC pixel and it will be reconstructed based on neighboring pixels. FIG. 9A-FIG. 9C illustrate three examples that can be used as neighboring pixels to reconstruct the color for the WC pixel. FIG. 9A illustrates an example that the color for the WC pixel is reconstructed based on two neighboring pixels on the left and right of the WC pixel. FIG. 9B illustrates an example that the color for the WC pixel is reconstructed based on two neighboring pixels from above and bottom of the WC pixel. FIG. 9C illustrates an example that the color for the WC pixel is reconstructed based on four neighboring pixels around four sides of the WC pixel.

FIG. 10A and FIG. 10B illustrate an example of two consecutive WC pixels indicated by two circles. All pixels around the two WC pixels can be used to derive the colors for the WC pixels. In other words, all pixels in the first three rows except for the two WC pixels can be used to derive the colors for the WC pixels. FIG. 10B illustrates an example where the colors for the two WC pixels are derived based on two neighboring pixels.

Derivation of color for the WC pixel can be the weighted sum of neighboring pixels. Furthermore, the weighted sum can be average, bilinear interpolation, or bi-cubic interpolation.

In FIGS. 9A-9C and 10A-10B, only neighboring one row/column is used as an example. Nevertheless, neighboring pixels can be multiple rows/columns.

The performance of a coding system incorporating an embodiment of the present invention is compared to an anchor system. The embodiment of the present invention corresponds to a palette coding system using adaptive horizontal and vertical scans. A new flag is used for a palette coded coding unit (CU) to indicate whether the horizontal or vertical scan is use. On the other hand, the anchor system only allows horizontal scan. The comparison results are summarized in Table 2. For a YUV test material consisting of moving text and graphics at 1080p, the embodiment of the present invention results in lower BD-rates for lossy palette coding. The BD-rate reductions for the All Intra (AI), Random Access (RA) and Low-delay B frame configurations are 0.4%, 0.2% and 0.1% respectively. The BD-rate is a well-known performance measure in the field of video coding.

TABLE 2

| Lossy coding BD-rate | AI | RA | LB |
|---|---|---|---|
| YUV, text & graphics with motion, 1080p | −0.4% | −0.2% | −0.1% |

In another comparison, the same embodiment and the anchor system are compared based on rotated test materials, where the test materials are rotated by 90 degrees so that a row in an original test material becomes a column in the rotated material. For the rotated YUV test material consisting of moving text and graphics at 1080p, the embodiment of the present invention results in a 3.5% lower BD-rate for lossy palette coding under the AI coding configuration.

Figure 11:
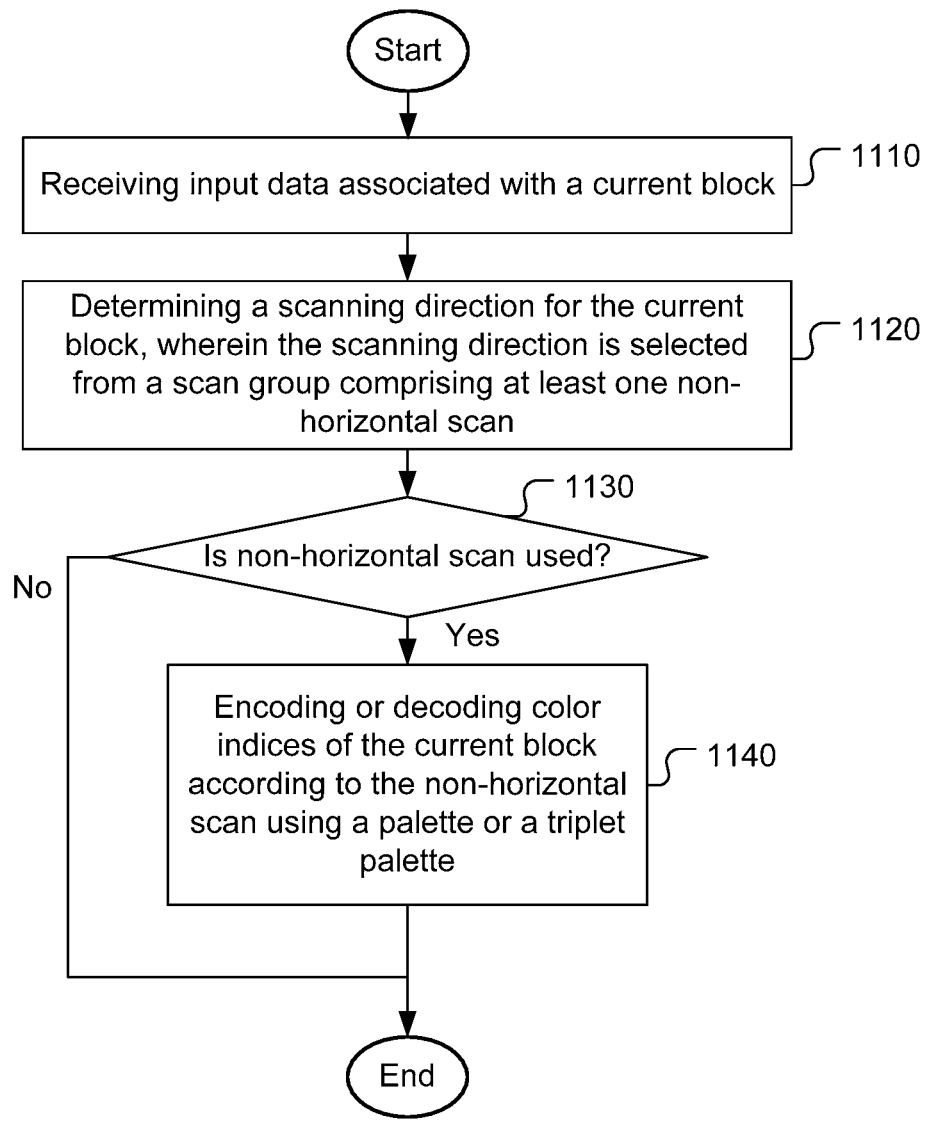
FIG. 11 illustrates an exemplary flowchart of a system for palette coding using multiple scanning orders for color index coding using a palette or a triplet palette according to an embodiment of the present invention.

FIG. 11 illustrates an exemplary flowchart of a system for palette coding using multiple scanning orders for color index coding using a palette or a triplet palette according to an embodiment of the present invention. The system receives input data associated with a current image area consisting of multiple blocks as shown in step 1110. The input data corresponds to pixel data of the current image area to be coded at an encoder side or corresponds to coded data of the current image area to be decoded at the decoder side. The input data may be retrieved from memory (e.g., computer memory, buffer (RAM or DRAM) or other media) or from a processor. A scanning direction for the current block is determined in step 1120. The scanning direction is selected from a scan group comprising at least one non-horizontal scan. Whether the non-horizontal scan is tested in step 1130. If the non-horizontal scan is used (i.e., the "Yes" path), the color indices of the current block are encoded or decoded according to the non-horizontal scan using a palette or a triplet palette in step 1140. Otherwise (i.e., the "No" path), the step 1140 is bypassed.

Figure 12:
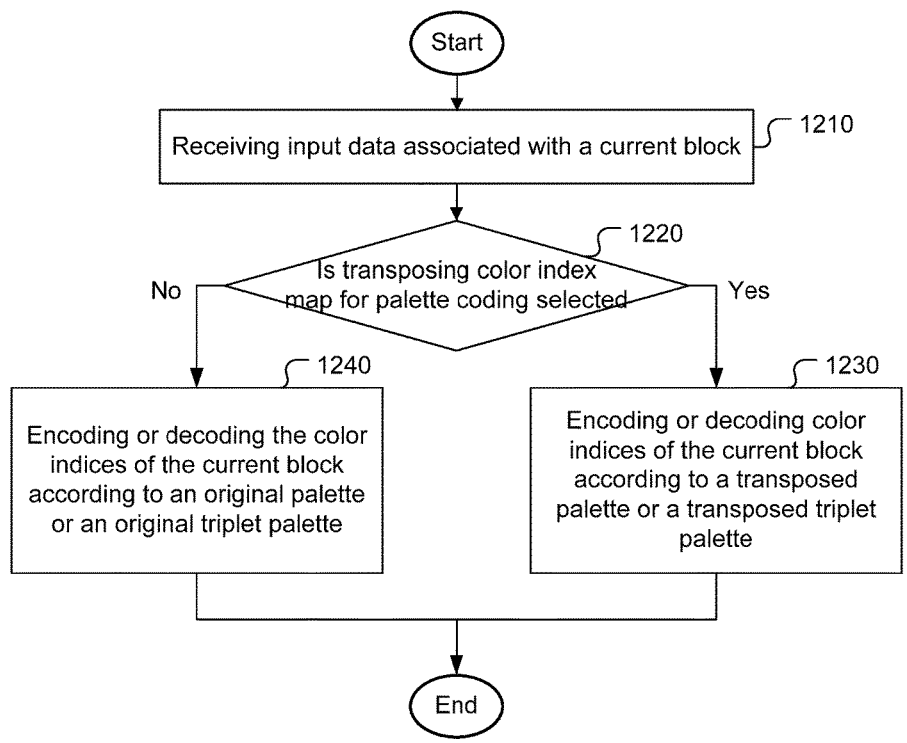
FIG. 12 illustrates an exemplary flowchart of a system for palette coding using a transposed palette or a transposed triplet palette according to an embodiment of the present invention.

FIG. 12 illustrates an exemplary flowchart of a system for palette coding using a transposed palette or a transposed triplet palette according to an embodiment of the present invention. The system receives input data associated with a current image area consisting of multiple blocks as shown in step 1210. Whether transposing a color index map for palette coding is selected is tested in step 1220. If transposing the color index map is selected (i.e., the "Yes" path), the color indices of the current block are encoded or decoded according to a transposed palette or a transposed triplet palette in step 1230. Otherwise (i.e., the "No" path), the color indices of the current block are encoded or decoded according to the original palette or the original triplet palette in step 1240.

The flowchart shown is intended to illustrate an example of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using palette coding in a video coding system, the method comprising:
   receiving input data associated with a current block;
   determining whether at least one coding unit (CU) is major color coded;
   when the at least one CU is major color coded, determining whether transposing a color index map for palette coding is selected via a flag for the at least one major color coded CU, wherein the flag indicates whether transposing the color index map is enabled or disabled;
   responsive to selecting transposing the color index map, encoding or decoding color indices of the current block according to a transposed palette or a transposed triplet palette;
   responsive to not selecting transposing the color index map, encoding or decoding the color indices of the current block according to an original palette or an original triplet palette,
   wherein said encoding or decoding the color indices of the current block according to the transposed palette or the transposed triplet palette comprises encoding the color indices of the transposed current block according to the original palette or the original triplet palette, or decoding/processing the color indices of the current block according to the original palette or the original triplet palette to generate the transposed current block,
   wherein the current block is transposed by swapping an x-index with a y-index of the color indices of the current block such that the color index map is flipped from a lower left corner to an upper right corner to cause a transposed current block, wherein flipping the color index map from the lower left corner to the upper right corner causes a set of first color indices on a top row of the current block to be transposed to a left column of the transposed current block.

2. The method of claim 1, wherein whether to transpose color index map is indicated at an encoder side by signaling a rotation flag or derived at a decoder side by parsing the rotation flag from a bitstream.

3. The method of claim 2, wherein the rotation flag is incorporated in a TU (transform unit) level, PU (prediction unit) level, CU coding unit) level, LCU (largest CU) level, slice level, picture level, PPS (picture parameter set), SPS (sequence parameter set) or VPS (video parameter set).

4. An apparatus of coding a block of video data using palette coding in a video coding system, the apparatus comprising one or more electronic circuits configured to:
receive input data associated with a current block;
determine whether at least one coding unit (CU) is major color coded;
when the at least one CU is major color coded, determine whether transposing color index map for palette coding is selected via a flag for the at least one major color coded CU, wherein the flag indicates whether transposing the color index map is enabled or disabled;
responsive to selecting transposing the color index map, encode or decode the color indices of the current block according to a transposed palette or a transposed triplet palette;
responsive to not selecting transposing the color index map, encode or decode the color indices of the current block according to an original palette or an original triplet palette,
wherein said encoding or decoding the color indices of the current block according to the transposed palette or the transposed triplet palette comprises encoding the color indices of the transposed current block according to the original palette or the original triplet palette, or decoding/processing the color indices of the current block according to the original palette or the original triplet palette to generate the transposed current block,
wherein the current block is transposed by swapping an x-index with a y-index of the color indices of the current block such that the color index map is flipped from a lower left corner to an upper right corner to cause a transposed current block, wherein flipping the color index map from the lower left corner to the upper right corner causes a set of first color indices on a top row of the current block to be transposed to a left column of the transposed current block.

5. The apparatus of claim 4, wherein whether to transpose color index map is indicated at an encoder side by signaling a rotation flag or derived at a decoder side by parsing the rotation flag from a bitstream.

* * * * *